(12) United States Patent
Nishino

(10) Patent No.: US 9,787,877 B2
(45) Date of Patent: Oct. 10, 2017

(54) IMAGE FORMING APPARATUS

(71) Applicant: KYOCERA Document Solutions Inc., Osaka (JP)

(72) Inventor: Tetsuya Nishino, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 15/352,081

(22) Filed: Nov. 15, 2016

(65) Prior Publication Data

US 2017/0155803 A1 Jun. 1, 2017

(30) Foreign Application Priority Data

Nov. 27, 2015 (JP) ................................. 2015-231519

(51) Int. Cl.
| | |
|---|---|
| H04N 1/04 | (2006.01) |
| H04N 1/44 | (2006.01) |
| G03G 15/00 | (2006.01) |
| H04N 1/00 | (2006.01) |

(52) U.S. Cl.
CPC .......... *H04N 1/4433* (2013.01); *G03G 15/50* (2013.01); *H04N 1/0097* (2013.01); *H04N 1/4413* (2013.01); *H04N 2201/0091* (2013.01); *H04N 2201/0094* (2013.01)

(58) Field of Classification Search
CPC ...... G06F 3/1288; G06F 21/62; G06F 21/608; G06F 3/1238; G06F 21/31; G06F 21/445; G06F 21/78; G06F 3/1237; G06F 3/1239; G06F 3/126; G06F 3/1273; G06F 3/1285; G06F 3/1296; H04N 21/4622

USPC ...... 358/1.15, 1.9, 1.13, 1.14, 452; 709/204, 709/203, 206, 213, 218, 229

See application file for complete search history.

(56) References Cited

U.S. PATENT DOCUMENTS

| | | | |
|---|---|---|---|
| 5,978,619 A | 11/1999 | Kato et al. | ........................ 399/80 |
| 8,510,756 B1 * | 8/2013 | Koryakin | ............. G06F 9/45558 718/1 |

(Continued)

FOREIGN PATENT DOCUMENTS

| | | |
|---|---|---|
| JP | 10-222031 A | 8/1998 |
| JP | 2005-271317 A | 10/2005 |

*Primary Examiner* — Negussie Worku
(74) *Attorney, Agent, or Firm* — Stein IP, LLC

(57) ABSTRACT

An image forming apparatus includes a storage unit, an input unit, and a control unit. The storage unit stores therein organizational department codes previously set one corresponding to each of organizational departments for an organizational department member to use the image forming apparatus, a guest department code, which is previously set for department management guests, who do not belong to any of the organizational departments, to use the image forming apparatus, and department function management information for managing function-use permission/prohibition with respect to each of the organizational department codes and the guest department code. The input unit receives an input regarding whether a user is an organizational department member or a department management guest. On receiving a use request from a department management guest via the input unit, the control unit finds an available function based on the guest department code and the department function management information.

6 Claims, 9 Drawing Sheets

(56) References Cited

U.S. PATENT DOCUMENTS

| | | | |
|---|---|---|---|
| 2004/0257610 A1* | 12/2004 | Itoh | H04L 29/06 358/1.15 |
| 2005/0102154 A1* | 5/2005 | Dodd | G06Q 10/06 705/7.32 |
| 2005/0216514 A1 | 9/2005 | Murata | 707/104.1 |
| 2014/0139869 A1* | 5/2014 | Honma | H04N 1/00347 358/1.15 |
| 2014/0372514 A1* | 12/2014 | Doui | G06F 3/1236 709/203 |
| 2015/0015908 A1* | 1/2015 | Tanaka | G06K 15/4095 358/1.14 |
| 2015/0058431 A1* | 2/2015 | Srikanth | H04L 51/066 709/206 |
| 2015/0249757 A1* | 9/2015 | Han | H04N 1/00307 358/1.15 |
| 2015/0295997 A1* | 10/2015 | Takasu | G07G 1/12 709/203 |
| 2016/0006887 A1* | 1/2016 | Takenaka | H04N 1/4433 358/1.13 |
| 2016/0085979 A1* | 3/2016 | Fukasawa | H04N 1/00151 726/17 |
| 2016/0098233 A1* | 4/2016 | Nishida | H04N 1/4413 358/1.14 |
| 2016/0191723 A1* | 6/2016 | Yue | H04N 1/00209 358/1.15 |
| 2016/0246554 A1* | 8/2016 | Yasuda | G06F 3/1292 |
| 2016/0274822 A1* | 9/2016 | Iwasaki | G06F 3/121 |
| 2017/0093870 A1* | 3/2017 | Meyer | H04L 63/10 |

\* cited by examiner

IMAGE FORMING APPARATUS

INCORPORATION BY REFERENCE

This application is based upon and claims the benefit of priority from the corresponding Japanese Patent Application No. 2015-231519 filed on Nov. 27, 2015, the entire contents of which are incorporated herein by reference.

BACKGROUND

The present disclosure relates to image forming apparatuses represented by copiers.

Some image forming apparatuses, such as a copier, a printer, a facsimile, etc., are equipped with a department management function. The department management function is a function of managing which function of an image forming apparatus is available to each of a plurality of operational departments in an organization such as a company, the status of usage of the functions, etc., with respect to each of the operational departments. For example, with the department management function, it is possible to decide whether to permit use of functions including copying, printing, image reading, and facsimile transmission, and to put restrictions on use of such functions when the number of printed sheets has been counted up to an upper limit value.

Here, there is known an image forming apparatus that includes storage means that stores therein a plurality of user identification codes and numbers of copies in association with each other and calculation means that calculates a set number of copies by adding up all the inputted numbers of copies to be printed, and that makes copies according to the set number of copies calculated by the calculation means. By just having an original document set once, this image forming apparatus is capable of making all copies of the original document by counting a number of copies with respect to each of department identification codes inputted in advance.

There is also known an image forming system that includes an image forming apparatus and a management device that manages information of a user of the image forming apparatus. Here, the management device judges whether a department associated with user information received from the image forming apparatus is permitted to make a copy, and sends the result of judgment to the image forming apparatus as department information. In a case where the department is permitted to make a copy, the image forming apparatus can perform a copying operation, count the number of copies made, and register the counted number of copies on a department-by-department basis.

SUMMARY

According to an aspect of the present disclosure, an image forming apparatus includes a storage unit, an input unit, and a control unit. The storage unit stores therein an organizational department code previously set one corresponding to each of a plurality of different organizational departments for a member of any of the organizational departments to use the image forming apparatus, a guest department code previously set for a department management guest, who does not belong to any of the organizational departments, to use the image forming apparatus, and department function management information for managing function-use permission/prohibition with respect to each of the organizational department codes and the guest department code. The input unit receives an input regarding whether a user is going to use the image forming apparatus as a member of any of the organizational departments or as the department management guest. The control unit finds which function is available based on the guest department code and the department function management information, in a case where a use request is received via the input unit from the department management guest.

DETAILED DESCRIPTION

Hereinafter, embodiments of the present disclosure will be described based on the accompanying drawings. It should be understood that the present disclosure is not limited to the following descriptions.

First Embodiment

Figure 1:
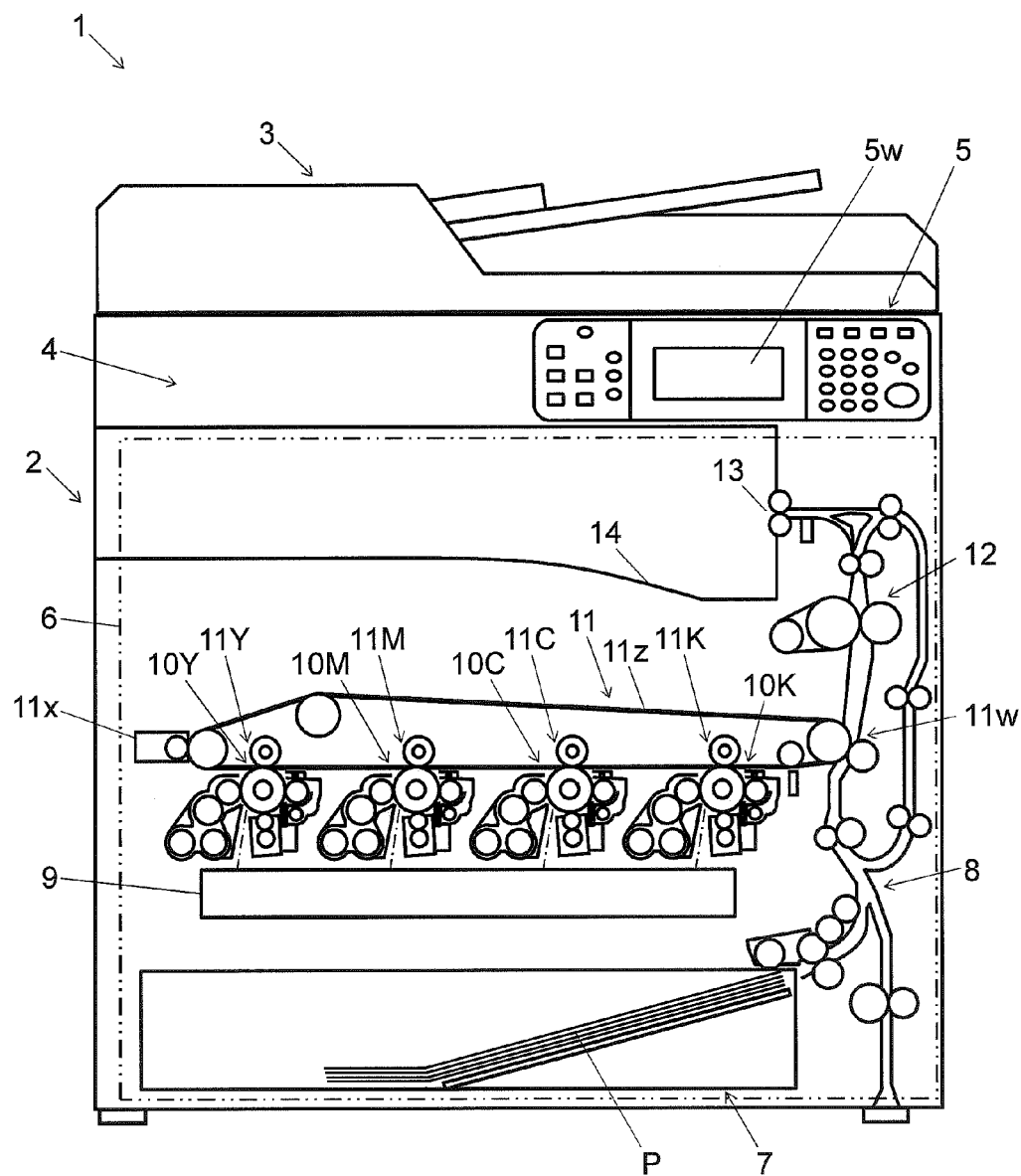
FIG. 1 is a front view of an image forming apparatus according to a first embodiment of the present disclosure.
Figure 2:
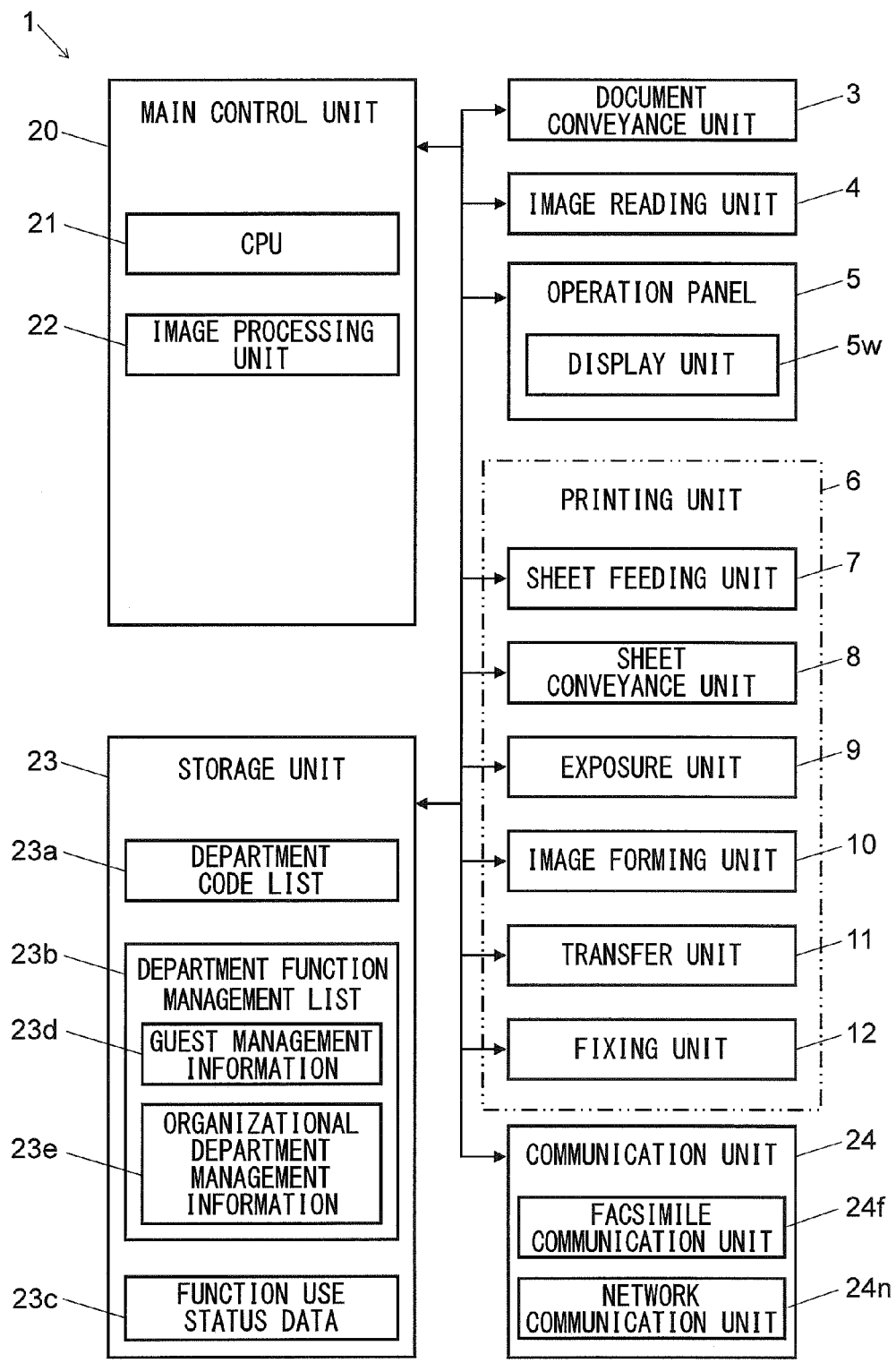
FIG. 2 is a block diagram illustrating a configuration of the image forming apparatus according to the first embodiment of the present disclosure.

First, descriptions will be given of a structure of, and an image forming operation and a printing operation performed by, an image forming apparatus according to a first embodiment of the present disclosure, with reference to FIG. 1 and FIG. 2. FIG. 1 is a front view of the image forming apparatus, and FIG. 2 is a block diagram illustrating a configuration of the image forming apparatus. The image forming apparatus is what is called a multifunction peripheral, which is equipped with functions such as a printing (copying) function, a scanning (image reading) function, and a facsimile transmitting function. Here, the image forming apparatus is a color image forming apparatus, and uses an intermediate transfer belt to transfer a toner image onto a sheet.

As illustrated in FIG. 1, the image forming apparatus 1 includes a body 2, a document conveyance unit 3 on top of the body 2, and an image reading unit 4 below the document conveyance unit 3, inside the body 2. To make the image forming apparatus 1 perform an image reading job, a user places a document sheet having an image thereon including a letter/character, a figure, a pattern, etc., or the user places such a document sheet on an unillustrated contact glass at an upper surface of the image reading unit 4. In the document conveyance unit 3, a document sheet or a plurality of document sheets are fed out separately one by one to the image reading unit 4, which reads an image on each document sheet. An image of a document sheet placed on the contact glass is read by scanning a light beam inside the image reading unit 4.

An instruction from the user to make the image forming apparatus 1 perform a printing (copying) job, a scanning (image reading) job, or a facsimile transmitting job is received by means of an operation panel 5, which is an input unit disposed on a front face side of the image reading unit 4, in an upper part of the body 2. The operation panel 5 receives, for example, user inputs of settings of printing conditions such as types and sizes of printing sheets, scaling, selection between single-side printing and duplex printing, etc., user inputs of facsimile settings such as a fax number, a fax sender's name, etc. The operation panel 5 serves also as a notification unit for notifying the condition of the apparatus, precautions, error messages, etc., by displaying them on a display unit 5w.

The image forming apparatus 1 further includes a printing unit 6 for performing printing jobs. The printing unit 6 is disposed below the image reading unit 4, inside the body 2. The printing unit 6 includes a sheet feeding unit 7, a sheet conveyance unit 8, an exposure unit 9, an image forming unit 10, a transfer unit 11, and a fixing unit 12.

The sheet feeding unit 7 accommodates sheets P which are laid one on another, and sends out the sheets P separately one by one to the sheet conveyance unit 8. Receiving a sheet P from the sheet feeding unit 7, the sheet conveyance unit 8 conveys the sheet P along a right-hand side surface in the body 2, vertically upward to a secondary transfer unit 11w of the transfer unit 11.

In a case of performing printing based on image data of a document sheet, information included in the image data is sent to a main control unit 20 (see FIG. 2), via which image processing and the like is performed on the image data, and then to the exposure unit 9. The exposure unit 9 emits laser light controlled based on the image data to the image forming unit 10.

The image forming unit 10 is composed of four image forming units, namely, a yellow image forming unit 10Y, a magenta image forming unit 10M, a cyan image forming unit 10C, and a black image forming unit 10K. In the following descriptions, the color identification symbols "Y", "M", "C", and "K" will be omitted unless specific identification is necessary.

The transfer unit 11 includes an intermediate transfer belt 11z, primary transfer units 11Y, 11M, 110, and 11K, a secondary transfer unit 11w, and an intermediate transfer cleaning unit 11x. The four image forming units 10 are aligned from an upstream side toward a downstream side along the intermediate transfer belt 11z in a rotation direction of the intermediate transfer belt 11z, and thus the image forming apparatus 1 is what is called a tandem-type image forming apparatus.

In the image forming units 10 for the respective colors, electrostatic latent images are formed by the laser light from the exposure unit 9 based on the image of the document sheet, and the electrostatic latent images are developed into toner images of the respective colors. The toner images of the respective colors are primarily transferred onto a surface of the intermediate transfer belt 11z by the primary transfer units 11Y, 11M, 110, and 11K above the image forming units 10Y, 10M, 10C, and 10K. The transfer of the toner images from the image forming units 10 to the intermediate transfer belt 11z is performed at predetermined timing while the intermediate transfer belt 11z is rotating, and thereby, yellow, magenta, cyan, and black toner images are superimposed one on another on the surface of the intermediate belt 11z, to thereby form a color toner image.

The color toner image on the surface of the intermediate transfer belt 11z is transferred onto a sheet P which has been synchronously conveyed by the sheet conveyance unit 8, at a secondary transfer nip portion formed in the secondary transfer unit 11w. After the secondary transfer of the color toner image, the intermediate transfer cleaning unit 11x performs cleaning by scraping residual toner off the surface of the intermediate transfer belt 11z.

The sheet P, onto which the toner image has been transferred at the secondary transfer nip portion, the toner image not having been fixed yet, is sent to the fixing unit 12 to be nipped between a heating roller and a pressure roller such that the toner image is heated and pressed to be fixed on the sheet P. After passing through the fixing unit 12, the sheet P is discharged to an internal sheet discharge unit 14 through a sheet discharge port 13. This is how the printing unit 6 performs printing of the image of the document on the sheet P.

For operation control of the entire apparatus, the image forming apparatus 1 includes the main control unit 20, which includes a CPU 21 and an image processing unit 22 (see FIG. 2), and also includes other electronic components, which are not illustrated. The main control unit 20 uses the CPU 21, which is a central processing device, and the image processing unit 22, to control components such as the image reading unit 4, the printing unit 6, etc. based on programs and data stored in the storage unit 23 or inputted from outside, and thereby achieves a series of image forming operation or a series of printing operation.

The mage forming apparatus 1 further includes a communication unit 24 for performing communication such as facsimile transmission and reception to and from an external communication device or an external computer. The communication unit 24 includes a facsimile communication unit 24f and a network communication unit 24n. The facsimile communication unit 24f is connected to a telephone line to perform transmission and reception of image data and the like with the external communication device via the telephone line. The network communication unit 24n is connected to a network line to perform transmission and reception of image data and the like with the external computer via the network line. The main control unit 20 makes the communication unit 24 perform the transmission and reception of image data to and from the external communication device, etc.

The image forming apparatus 1 operates in an operation mode in which the image forming apparatus 1 performs a normal image forming or printing operation, and in addition to such an operation mode, the image forming apparatus 1 is capable of operating in, and making use of, another operation mode named a department management mode for managing functions available to each of a plurality of different operational departments and the status of usage of such functions. Switching between on and off of the department management mode, which will be described later in detail, can be done via the operation panel 5.

Figure 3:
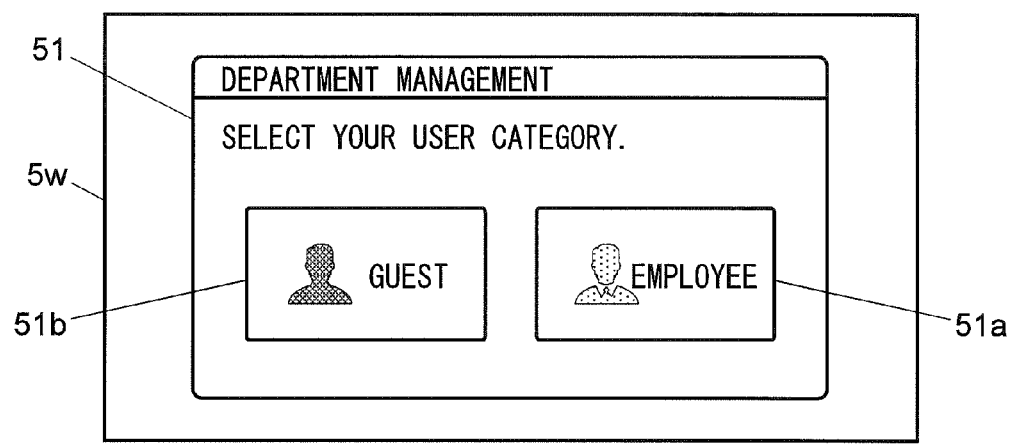
FIG. 3 is a front view of a display unit of the image forming apparatus according to the first embodiment of the present disclosure, illustrating a configuration of the display unit at the time of login in a department management mode.
Figure 4:
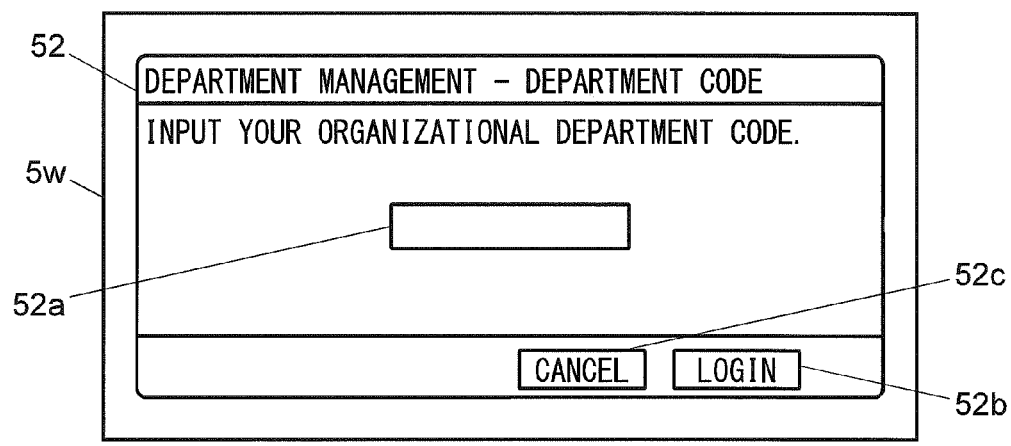
FIG. 4 is a front view of the display unit of the image forming apparatus according to the first embodiment of the present disclosure, illustrating a configuration of the display unit at the time of inputting a organizational department code in the department management mode.
Figures 5, 6:
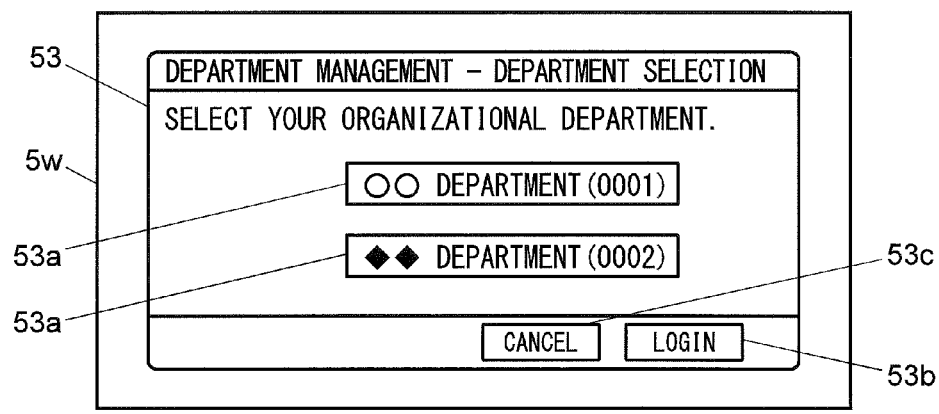
FIG. 5 is a front view of the display unit of the image forming apparatus according to the first embodiment of the present disclosure, illustrating a configuration of the display unit at the time of selecting an organizational department in the department management mode.
FIG. 6 is a front view illustrating a configuration of a function restriction management screen in the department management mode of the image forming apparatus according to the first embodiment of the present disclosure.

Next, a description will be given of a detailed configuration related to the department management mode of the image forming apparatus 1 and an operation in the department management mode, with reference not only to FIG. 1 and FIG. 2, but also to FIG. 3 to FIG. 6. FIG. 3 is a front view illustrating a configuration of the display unit 5w at the time of login in the department management mode, and FIG. 4 is a front view illustrating a configuration of the display unit 5w at the time of inputting an organizational department code. FIG. 5 is a front view illustrating a configuration of a function restriction management screen in the department management mode. FIG. 6 is a flowchart illustrating an example of copying processing in the department management mode.

The department management mode is for managing function-use permission/prohibition given to, function use restriction put on, and status of function use by, each of a plurality of different departments, with respect to functions such as a printing (copying) function, a scanning (image reading) function, a facsimile transmitting function, etc. For example, as for the function use restriction, an upper limit is previously set to the number of sheets permitted to be used for each function in each month, and when the upper limit is reached for a function in a month, the function becomes unavailable from that time on through the rest of the month.

Furthermore, in the department management mode of the image forming apparatus 1, a judgment is made on whether a user of the image forming apparatus 1 is an organizational department member, who belongs to any of a plurality of different organizational departments or a department management guest, who belongs to none of the organizational departments. Members of organizational departments are managed on a department by department basis, while department management guests are all managed as members of a guest department. Thus, in the department management mode, it is possible to individually manage, for example, the function-use permission/prohibition given to, the function use restriction put on, the status of function use by, each of the departments including the organizational departments and the guest department.

Here, in the department management mode of the image forming apparatus 1, the display unit 5w displays on its screen a login window 51 of the department management mode, as illustrated in FIG. 3. The login window 51 includes an organizational department member icon 51a corresponding to organizational department members (employees), who belong to the organizational departments and a department management guest icon 51b corresponding to department management guests, who belong to none of the organizational departments, and a user is requested to identify himself or herself as an organizational department member or a department management guest by selecting the icon 51a or the icon 51b. The display unit 5w includes a touch panel unit, which is not illustrated.

When the organizational department member icon 51a is selected, the display unit 5w displays on its screen an organizational department code input window 52 of the department management mode, as illustrated in FIG. 4. The organizational department code input window 52 includes an input form 52a for inputting an organizational department code, a login button 52b, and a cancel button 52c, via which an input of an organizational department code is received.

Here, the organizational department codes are previously set one corresponding to each of a plurality of organizational departments belonging to an organization, for members of the organizational departments to use the image forming apparatus 1. On the other hand, a guest department code is previously set for department management guests, who do not belong to any of the organizational departments, to use the image forming apparatus 1. The organizational department codes and the guest department code are managed in a later-described department code list 23a.

An organizational department member inputs and sets his or her organizational department code such as "0001" or "0002" via the organizational department code input window 52. On the other hand, when a user has logged in as a department management guest by selecting the department management guest icon 51b, the guest department code ("0000", for example) corresponding to department management guests is automatically set, and thus the organizational department code input window 52 is not displayed. Users are not required to input their personal identification code numbers, pass words, etc.

Further, regarding the identification of the organizational departments, FIG. 5 illustrates an organizational department selection window 53 as another example. Displayed in the organizational department selection window 53 are a plurality of selection buttons 53a, a login button 53b, and a cancel button 53c. When one of the selection buttons 53a is pressed, the main control unit 20 sets, for the current user, an organizational department code corresponding to the selected one of the selection buttons 53a.

Note that the login process in the department management mode by using the login window 51 and the organizational department code input window 52 may be performed either before or after selecting one of the functions of printing (copying), scanning (image reading), facsimile transmission, etc.

Regarding the department management and the guest management, the storage unit 23 stores therein a department code list 23a, a department function management list 23b, and a function use status data 23c.

Indicated in the department code list 23a are, for example, organizational department codes such as "0001", "0002", etc. in association with names of operational departments corresponding to the organizational department codes. As described above, the organizational department codes are previously set one corresponding to each of the plurality of organizational departments for members of the organizational departments to use the image forming apparatus 1. Here, department management guests are managed by means of a list in which they are listed in association with the guest department code such as "0000", for example. As described above, the guest department code is previously set for department management guests, who do not belong to any of the organizational departments, to use the image forming apparatus 1.

The department function management list 23b is department function management information, in which there are listed function-use permission/prohibition given to, and function use restriction put on, each of the departments including the organizational departments and the guest department. The function-use permission/prohibition and the function use restriction with respect to each of the organizational departments and the guest department may be set, for example, by using a function restriction management screen 54 shown in FIG. 6. The department function management list 23b, settable in the function restriction management screen 54, includes guest management information 23d, in which the use permission/prohibition and the use restriction are set with respect to department management guests, and organizational department management information 23e, in which the use permission/prohibition and the use restriction are set with respect to members of the organizational departments. It is only an administrator of the image forming apparatus 1 who is permitted to use the function restriction management screen 54, and general users are not permitted to use it.

Sellable on the function restriction management screen 54 are the function-use permission/prohibition and an upper limit of the number of sheets to be used for each of the functions of printing including copying, scanning, and facsimile transmission, with respect to each of the departments corresponding to the department codes. The setting of the printing function may include setting of a total number of sheets for monochrome printing and color printing. Users belonging to the organizational departments or the guest department are permitted to use a function having a check mark in a box to the left of an upper limit number box. For each function that is available, an upper limit is set for the number of sheets usable for the function. The upper limit number of sheets is a number of sheets to be used in a predetermined management period such as one month, for example, and is set on another management screen which is not illustrated.

For example, in an example of the department function management list 23b illustrated in FIG. 6, with respect to the guest department (indicated by the department code "0000"), use restriction is put on the scanning function and the facsimile transmission function. With respect to the operational department corresponding to the department code "0001", use restriction is put on the color printing function and the facsimile transmission function. The operational department corresponding to the department code "0002" is permitted to use all the functions of printing (monochrome and color), scanning, and facsimile transmission.

When a use request is received from a user as a department management guest via the operation panel 5, the main control unit 20 finds which function is available to the user based on the guest department code and the department function management list 23b. When a use request is received from a user as an organizational department member via the operation panel 5, the main control unit 20 finds which function is available to the user based on the organizational department code and the department function management list 23b.

Recorded in the function use status data 23c is status of use of each of the printing (monochrome printing, color printing, and total of monochrome and color printing), scanning, and facsimile transmission functions with respect to each of the organizational departments and the guest department in terms of the number of sheets used in each of the functions. Once the previously set upper limit number of sheets permitted to be used in a function in the predetermined unit management period is reached, further use of the function is prohibited from then on through the rest of the unit period.

Figure 7:
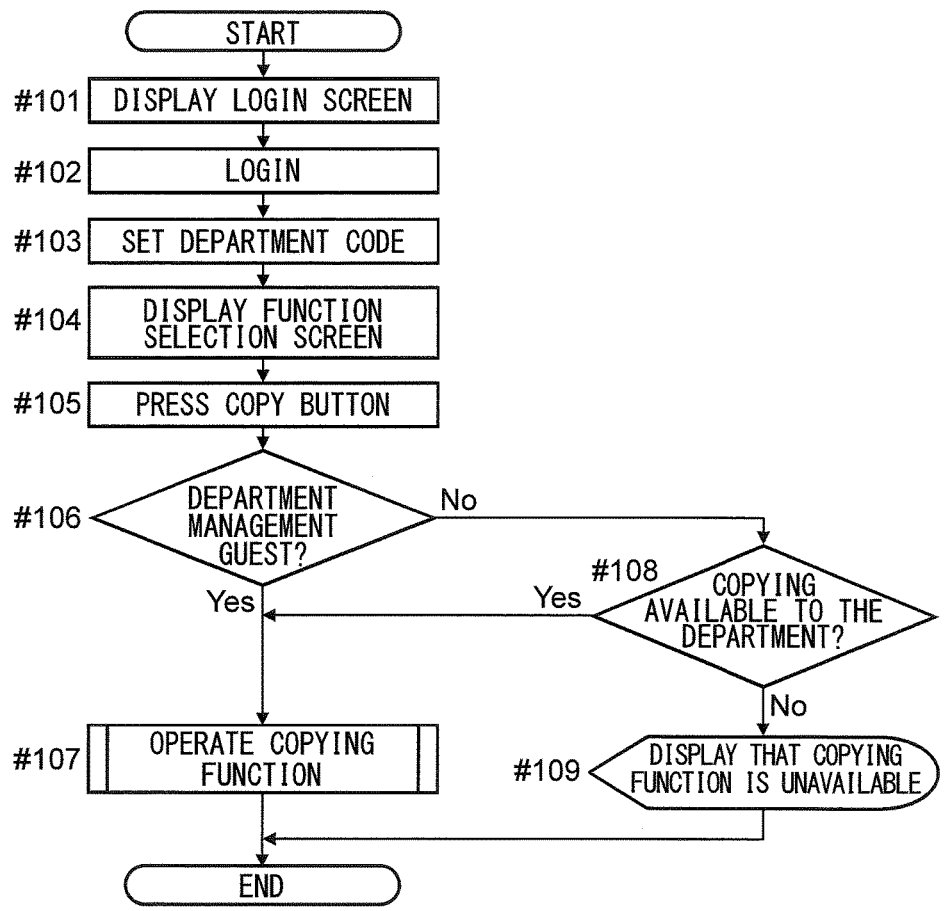
FIG. 7 is a flowchart illustrating an example of copying processing performed by the image forming apparatus according to the first embodiment of the present disclosure in the department management mode.

Next, a description will be given of an example of the copying processing in the department management mode, following the flow illustrated in FIG. 7. FIG. 6 will be referred to for the use permission/prohibition (function restriction) of each function with respect to each department.

When the image forming apparatus 1 starts to operate in the department management mode ("START" in FIG. 7), the main control unit 20 makes the display unit 5w of the operation panel 5 display the login window 51 of the department management mode at step #101.

At step #102, the operation panel 5 receives a login request from a user. At this time, the user performs an input operation via the login window 51, and further, via the organizational department code input window 52 (or the organizational department selection window 53), to identify himself or herself as a department management guest or an organizational department member.

At step #103, for the current user from whom the login request has been received via the operation panel 5, the main control unit 20 sets a corresponding organizational department code if the current user is an organizational department member, and sets the guest department code if the current user is a department management guest.

At step #104, the main control unit 20 makes the display unit 5w of the operation panel 5 display a function selection screen for the user to select a function from among the printing (copying) function, the scanning (image reading) function, the facsimile transmission function, etc.

At step #105, the operation panel 5 receives a copy-button pressing operation performed by the user.

At step #106, the main control unit 20 judges whether the current user of the image forming apparatus 1 is a department management guest. Further, at this time, the main control unit 20 judges which function is available to a department management guest based on the guest management information 23d. If the current user is a department management guest, the copying function is available, and thus the process proceeds to step #107. If the current user is not a department management guest but an organizational department member, the process proceeds to step #108 to further judge whether the user belongs to an organizational department that is permitted to use the copying function.

At step #107, the image forming apparatus 1 performs an operation related to the copying function. Then, the copying processing in the department management mode is finished ("END" in FIG. 7).

At step #108, the main control unit 20 judges, based on the organizational department management information 23e, whether the current user of the image forming apparatus 1 belongs to an organizational department that is permitted to use the copying function. Here, for example, monochrome copying is available to members of the organizational departments respectively indicated by the department codes "0001" and "0002", and color copying is available to members of the organizational department indicated by the department code "0002". When the current user belongs to an organizational department that is permitted to use the copying function, the process proceeds to step #107. When the current user belongs to an organizational department that is not permitted to use the copying function, the process proceeds to step #109.

At step #109, the display unit 5w displays a notification to the effect that the copying function is not available. Then, the copying processing in the department management mode is finished ("END" in FIG. 7).

In this manner, the guest department code is set for a department management guest and a corresponding organizational department code is set for an organizational department member, and based on the department function management list 23b, a judgment on which function is available is made with respect to each of the guest department code and the organizational department codes.

Second Embodiment

Figure 8:
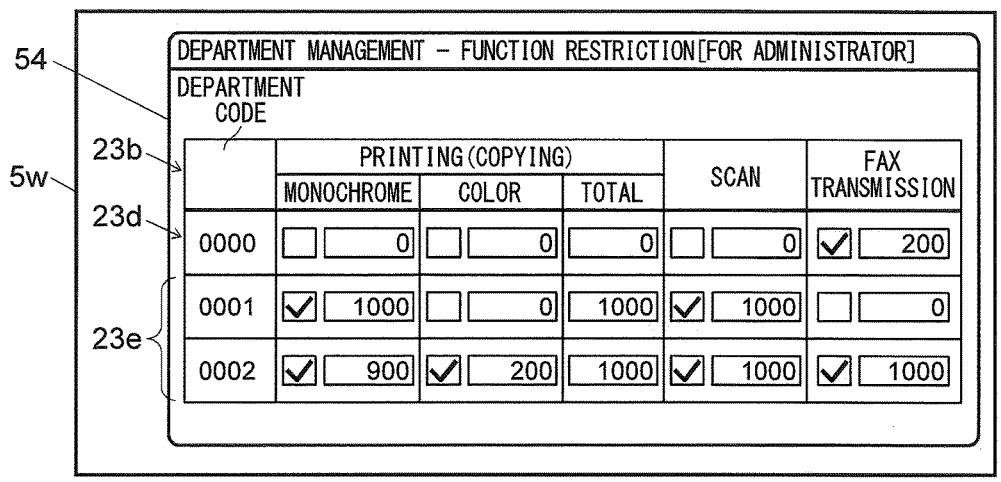
FIG. 8 is a front view illustrating a configuration of a function restriction management screen in the department management mode of an image forming apparatus according to a second embodiment of the present disclosure.
Figure 9:
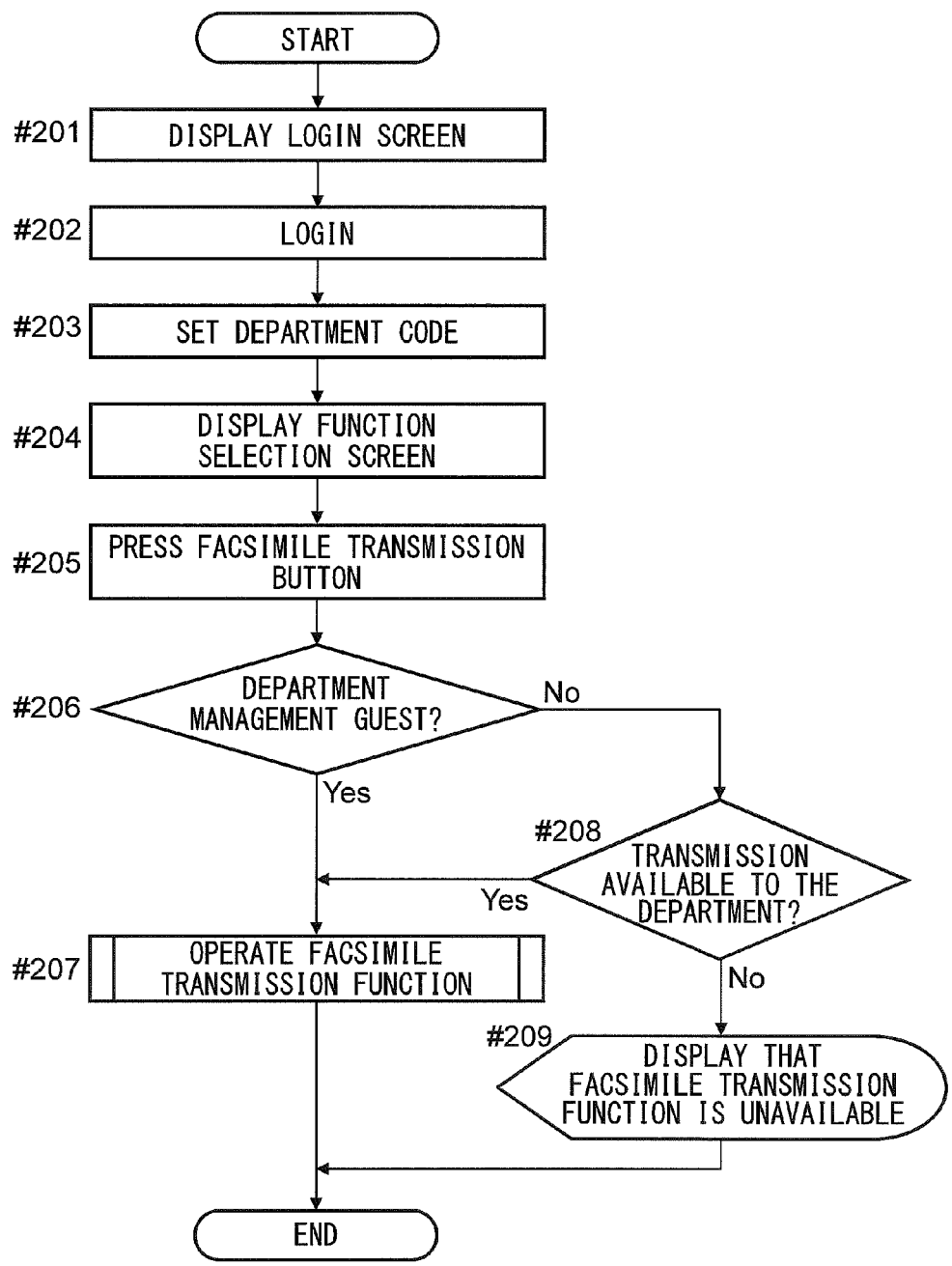
FIG. 9 is a flowchart illustrating an example of transmission processing performed by the image forming apparatus according to the second embodiment of the present disclosure in the department management mode.

Next, a description will be given of an image forming apparatus according to a second embodiment of the present disclosure with reference to FIG. 8 and FIG. 9. FIG. 8 is a front view illustrating a configuration of a function restriction management screen in a department management mode of the image forming apparatus. FIG. 9 is a flowchart illustrating an example of transmission processing in the department management mode. Here, the basic configuration of the present embodiment is the same as that of the first embodiment described above, and thus such components as are common to both the first and present embodiments are identified with the same reference signs as used in the first embodiment, and overlapping descriptions thereof may sometimes be omitted.

In the image forming apparatus 1 of the second embodiment, a storage unit 23 stores therein a department function management list 23b illustrated in FIG. 8, which includes guest management information 23d and organizational department management information 23e.

For example, in the example of the department function management list 23b illustrated in FIG. 8, use restriction is put on the printing function and the scanning function with respect to the guest department (for which the department code is "0000"). With respect to the operational department indicated by the department code "0001", use restriction is put on the color printing function and the facsimile transmission function. The operational department indicated by the department code "0002" is permitted to use all of the printing (monochrome and color), the scanning, and the facsimile transmission functions.

Next, a description will be given of an example of facsimile transmission processing in the department management mode, along the flowchart illustrated in FIG. 9. FIG. 8 will be referred to for use permission/prohibition of (function restriction put on) each function with respect to each department.

When the image forming apparatus 1 starts to operate in the department management mode ("START" in FIG. 9), a main control unit 20 makes a display unit 5w of an operation panel 5 display a login window 51 of the department management mode at step #201.

At step #202, the operation panel 5 receives a login request from a user. At this time, the user performs an input operation to identify himself or herself as a department management guest or an organizational department member.

At step #203, for the current user from whom the login request has been received via the operation panel 5, the main control unit 20 sets a corresponding organizational department code if the current user is an organizational department member, and sets the guest department code if the current user is a department management guest.

At step #204, the main control unit 20 makes the display unit 5w of the operation panel 5 display a function selection screen.

At step #205, the operation panel 5 receives a facsimile transmission-button pressing operation performed by the user.

At step #206, the main control unit 20 judges whether the current user of the image forming apparatus 1 is a department management guest. Further, at this time, the main control unit 20 judges which function is available to a department management guest based on the guest management information 23d. If the current user is a department management guest, the facsimile transmission function is available, and thus the process proceeds to step #207. If the current user is not a department management guest but an organizational department member, the process proceeds to step #208 to further judge whether the user belongs to an organizational department that is permitted to use the facsimile transmission function.

At step #207, the image forming apparatus 1 performs an operation related to the facsimile transmission function. Then, the facsimile transmission processing in the department management mode is finished ("END" in FIG. 9).

At step #208, the main control unit 20 judges, based on the organizational department management information 23e, whether the current user of the image forming apparatus 1 belongs to an organizational department that is permitted to use the facsimile transmission function. If the current user belongs to the organizational department indicated by the department code "0002", which is permitted to use the facsimile transmission function, the process proceeds to step #207. If the current user belongs to the organizational department indicated by the department code "0001", which is not permitted to use the copying function, the process proceeds to step #209.

At step #209, the display unit 5w displays a notification to the effect that the facsimile transmission function is not available. Then, the facsimile transmission processing in the department management mode is finished ("END" in FIG. 9).

Third Embodiment

Figure 10:
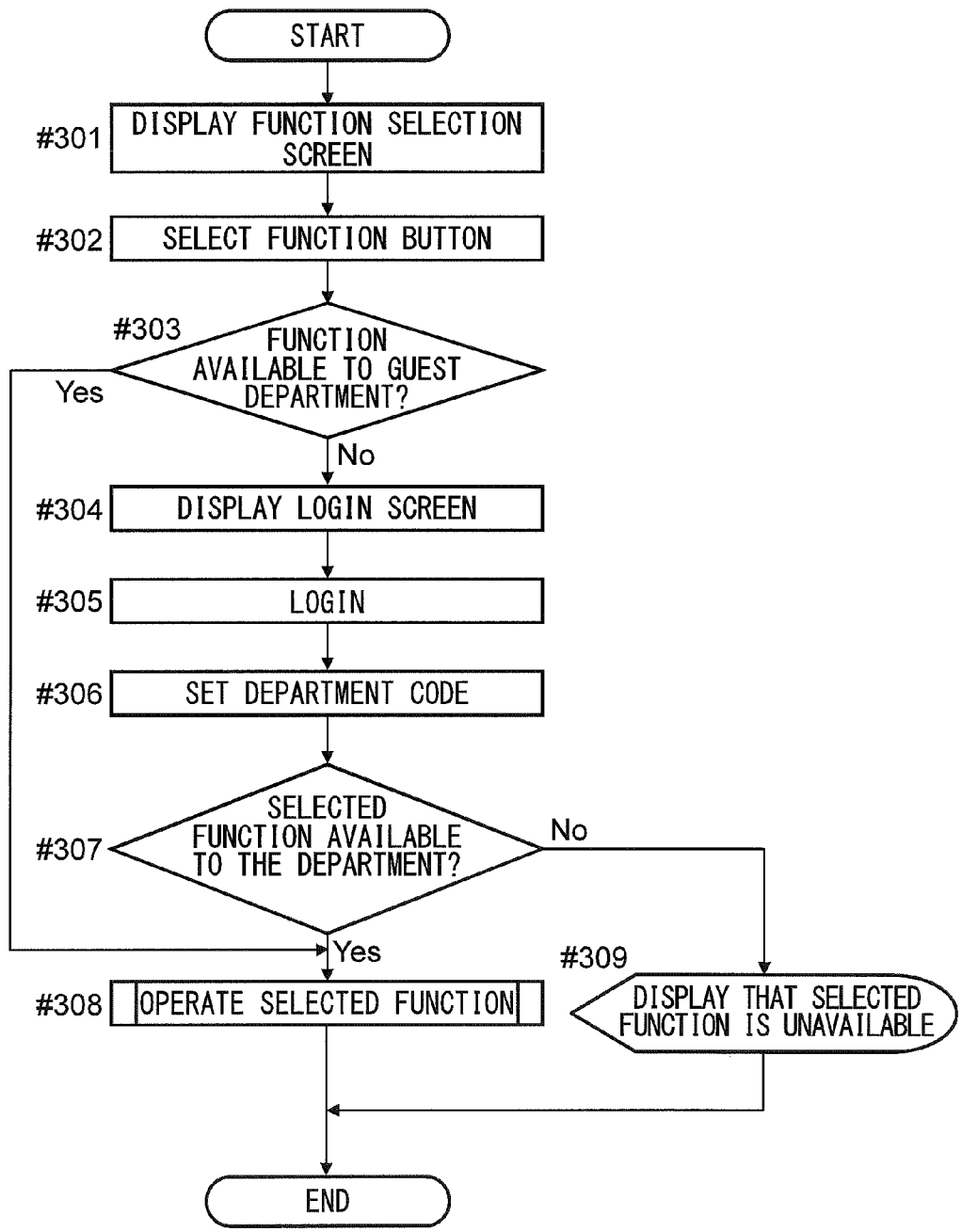
FIG. 10 is a flowchart illustrating an example of a department management mode of an image forming apparatus according to a third embodiment of the present disclosure.

Next, an image forming apparatus according to a third embodiment of the present disclosure will be described with reference to FIG. 10. FIG. 10 is a flowchart showing an example of a department management mode. The basic configuration of the present embodiment is the same as those of the first and second embodiments described above, and thus such components as are common to those embodiments are identified with the same reference signs as those used in the first and second embodiments, and overlapping descriptions thereof may sometimes be omitted.

When the image forming apparatus 1 starts to operate in the department management mode ("START" in FIG. 10), a main control unit 20 makes a display unit 5w of an operation panel 5 display a function selection screen at step #301.

At step #302, the operation panel 5 receives a function selecting operation performed by a user.

At step #303, the main control unit 20 judges whether the function selected and received via the operation panel 5 is available to the guest department. If the selected function is available to the guest department, the process proceeds to step #308. If the selected function is not available to the guest department, the process proceeds to step #304.

At step #304, the main control unit 20 makes the display unit 5w of the operation panel 5 display a login window 51 of the department management mode.

At step #305, the operation panel 5 receives a login request from the user. At this time, the user makes an input to identify himself or herself as an organizational department member.

At step #306, the main control unit 20 sets an organizational department code for the current user, from whom the login request has been received via the operation panel 5.

At step #307, the main control unit 20 judges, based on a department function management list 23b, whether the organizational department corresponding to the organizational department code set for the current user of the image forming apparatus 1 is permitted to use the previously selected function. When the selected function is available to the organizational department, the process proceeds to step #308. When the selected function is not available to the organizational department, the process proceeds to step #309.

At step #308, the image forming apparatus 1 performs an operation related to the selected function. Then, the processing in the department management mode is finished ("END" in FIG. 10).

At step #309, the display unit 5w displays a notification to the effect that the selected function is not available. Then, the processing in the department management mode is finished ("END" in FIG. 10).

In this manner, the image forming apparatus of the third embodiment performs the login process in the department management mode after a function is selected from functions such as the printing (copying) function, the scanning (image reading) function, and the facsimile transmission function.

Fourth Embodiment

Figure 11:
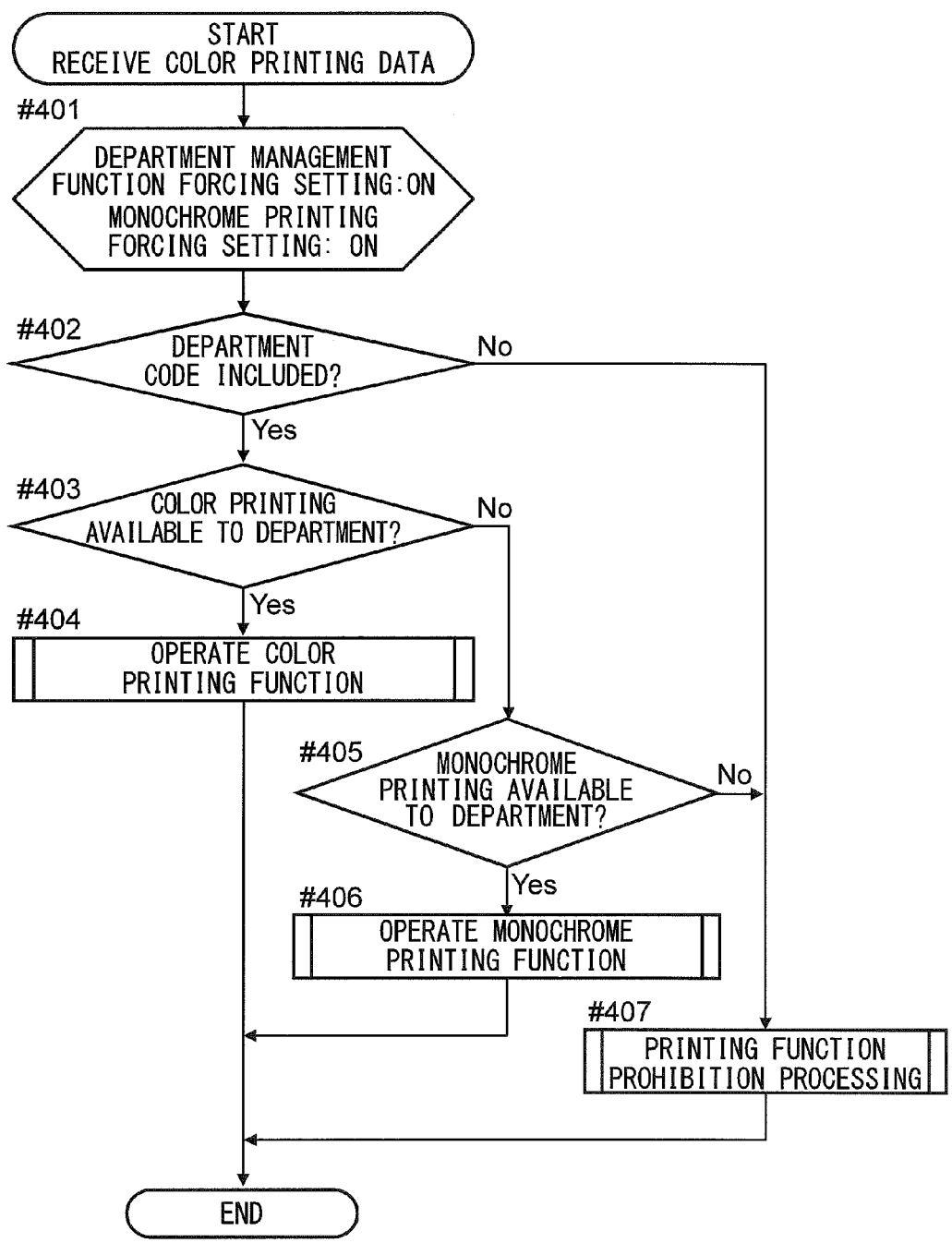
FIG. 11 is a flowchart illustrating an example of printing processing performed by an image forming apparatus according to a fourth embodiment of the present disclosure in a department management mode.

Next, an image forming apparatus according to a fourth embodiment of the present disclosure will be described with reference to FIG. 11. FIG. 11 is a flowchart illustrating an example of printing processing in a department management mode.

Here, the basic configuration of the present embodiment is the same as that of the first embodiment described above, and thus such components as are common to both the first and present embodiments are identified with the same reference signs as used in the first embodiment, and overlapping descriptions thereof may sometimes be omitted.

The image forming apparatus 1 of the fourth embodiment receives job execution request information related to use of a function of the image forming apparatus 1 from a terminal device, such as an external computer, via a communication unit 24, and starts to operate in the department management mode ("START" in FIG. 11).

Here, assume that a job execution instruction received from an external computer or the like requests use of the printing function, and that job execution request information related to the use of the function is color printing data. The color printing data includes document image information and a control command for performing color printing. Further, a department code for department management may be included in the control command.

At step #401, it is defined in advance that department management function forcing setting is effective (ON) in the image forming apparatus 1. As a result, in a case where no department code is included in the job execution request information related to the use of a function, such as color printing data, the image forming apparatus 1 does not permit use a function such as printing. On the other hand, although not described in detail here, in a case where the department management function forcing setting is not effective (OFF), for example, it is possible to use a function even if no department code is included in the job execution request information related to the use of a function.

Further, it is defined in advance that monochrome printing forcing setting is effective (ON) in the image forming apparatus 1. As a result, regarding printing, in a case where color printing data has been received from a department that is permitted to use the monochrome printing function but is not permitted to use the color printing function, the image forming apparatus 1 is forced to perform monochrome printing.

At step #402, the main control unit 20 judges whether the color printing data received via the communication unit 24 includes a department code, and if a department code is included, the main control unit 20 judges whether the included department code indicates an organizational department or a guest department. If a department code is included in the color printing data, the process proceeds to step #403. If no department code is included in the color printing data, the process proceeds to step #407.

At step #403, the main control unit 20 judges, based on the department function management list 23b, whether the department corresponding to the department code included in the color printing data is permitted to use the color printing function. If the department is permitted to use the color printing function, the process proceeds to step #404. If the department is not permitted to use the color printing function, the process proceeds to step #405.

At step #404, the image forming apparatus 1 performs an operation related to the color printing function. Then, the processing in the department management mode of the case where job execution request information related to the use of a function of the image forming apparatus 1 has been received from an external computer or the like is finished ("END" in FIG. 11).

At step #405, the main control unit 20 judges, based on the department function management list 23b, whether the department corresponding to the department code included in the color printing data is permitted to use the monochrome printing function. If the department is permitted to use the monochrome printing function, the process proceeds to step #406. If the department is not permitted to use the monochrome printing function, the process proceeds to step #407.

At step #406, the image forming apparatus 1 performs an operation related to the monochrome printing function. Then the processing in the department management mode in the case where job execution request information related to the use of a function of the image forming apparatus 1 has been received from an external computer or the like is finished ("END" in FIG. 11).

At step #407, the image forming apparatus 1 performs processing related to prohibition of use of the printing function. At this time, information related to a notification to the effect that the printing function is not available is transmitted via the communication unit 24 to the external computer or the like that has transmitted the color printing data to the image forming apparatus 1, for example. In the external computer or the like, for example, a massage to the effect that the printing function is not available is displayed on a display unit or the like. Then the processing in the department management mode in the case where job execution request information related to the use of a function of the image forming apparatus 1 has been received from an external computer or the like is finished ("END" in FIG. 11).

Fifth Embodiment

Figure 12:
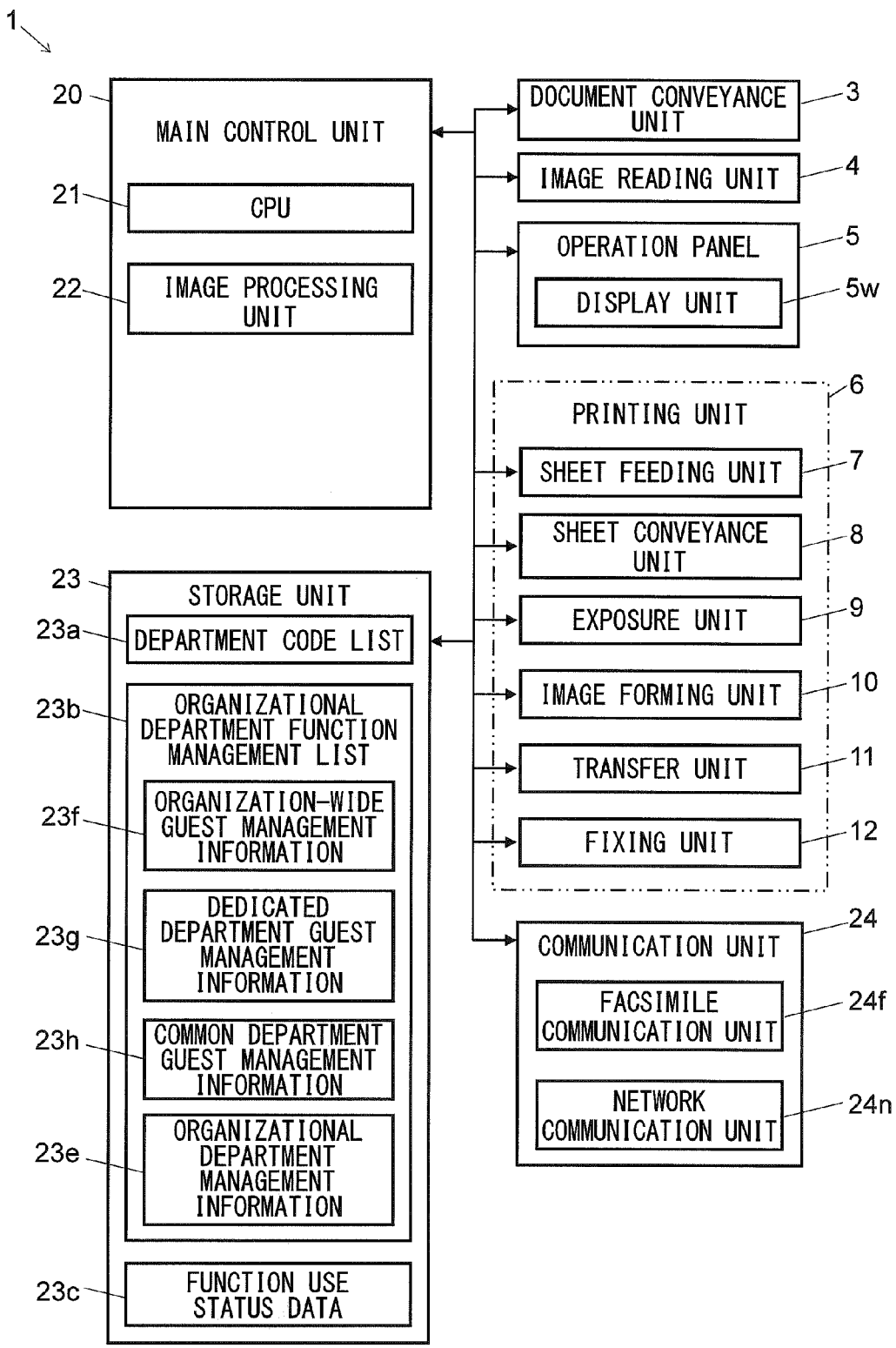
FIG. 12 is a block diagram illustrating a configuration of an image forming apparatus according to a fifth embodiment of the present disclosure.

Next, an image forming apparatus according to a fifth embodiment of the present disclosure will be described with reference to FIG. 12. FIG. 12 is a block diagram illustrating a configuration of the image forming apparatus. Here, the basic configuration of the present embodiment is the same as that of the first embodiment described above, and thus such components as are common to both the first and present embodiments are identified with the same reference signs as used in the first embodiment, and overlapping descriptions thereof may sometimes be omitted.

In the image forming apparatus 1 of the fifth embodiment, one guest department code is provided corresponding to all of a plurality of organizational departments, a plurality of guest department codes re provided one corresponding to each organizational department, and a plurality of guest department codes are provided each corresponding to some of the plurality of organizational departments. Regarding this, as illustrated in FIG. 12, a department function management list 23b, which is function management information, includes organization-wide guest management information 23f, dedicated department guest management information 23g, common department guest management information 23h, and organizational department management information 23e.

The organization-wide guest management information 23f is management information related to a guest department code set as one common guest department code to be shared by all of a plurality of organizational departments. Set in the organization-wide guest management information 23f are function use-permission/prohibition and function use restriction with respect to a department management guest common to all the plurality of organizational departments.

The dedicated department guest management information 23g is management information related to guest department codes set one with respect to each organizational department. Set in the dedicated department guest management information 23g are function-use permission/prohibition and function use restriction with respect to a dedicated department management guest of each of the organizational departments.

The common department guest management information 23h is management information related to a plurality of guest department codes each set as one common guest department code to be shared by some organizational departments previously selected from the plurality of organizational departments. Set in the common department guest management information 23h are function-use permission/ prohibition and function use restriction with respect to a department management guest who belongs to some organizational departments previously selected from the plurality of organizational departments.

As in the first to fifth embodiments described above, an image forming apparatus 1 includes a storage unit 23, an operation panel 5 as an input unit, and a main control unit 20. The storage unit 23 stores therein organizational department codes, which are previously set one corresponding to each of a plurality of organizational departments in an organization for members of the organizational departments to use the image forming apparatus 1, a guest department code, which is previously set for a department management guest, who does not belong to any of the organizational departments, to use the image forming apparatus 1, and a department function management list 23b, which is department function management information for managing function-use permission/prohibition with respect to each of the organizational department codes and the guest department code. The operation panel 5 receives an input regarding whether a user is going to use the image forming apparatus 1 as a member of any of the organizational departments or as the department management guest. When a use request is received from a department management guest via the operation panel 5, the main control unit 20 finds which function is available based on the guest department code and the department function management list 23b.

With this configuration, when a use request is received from a department management guest via the operation panel 5, a judgment is made, based on the previously set guest department code and the department function management list 23b, on which function is available. This makes it possible to perform simple department management with respect to each function in the image forming apparatus 1. This allows a department management guest to use a predetermined function without inputting the guest department code. This contributes to improved handiness of the image forming apparatus 1.

When the selected function is one available to the guest department, the main control unit 20 permits use of the selected function. When the selected function is one unavailable to the guest department, the main control unit 20 requires input of an organizational department code. Then, if the function is set to be available to the inputted organizational department code, the main control unit 20 permits use of the function, but if the function is not set to be available to the inputted organizational department code, the main control unit 20 does not permit use of the function.

According to this configuration, in a case where a user who is a department management guest is prevented from using a function, input of an organizational department code makes it possible for the user to use the function. Thus, it is possible to improve handiness of the image forming apparatus 1 for members of the organizational departments, too.

The image forming apparatus 1 of the fourth embodiment further includes a communication unit 24, which is capable of communicating with an external terminal device. The main control unit 20 receives, via the communication unit 24, job execution request information related to use of a function, that is, a department code included in color printing data. Based on the department code, the main control unit 20 finds which function is available.

Further, in the image forming apparatus 1 of the fourth embodiment, in a case where no department code is included in the job execution request information related to use of a function and received via the communication unit 24, the main control unit 20 does not permit use of the unction.

According to these configurations, in a case where job execution request information related to a function such as printing has been received from an external device such as a computer, too, it is possible to perform simple department management with respect to each function. And, management is possible in such a manner, for example, that in a case where no department code is included in printing data related to use of the printing function, the printing function of the image forming apparatus 1 is made unavailable.

Furthermore, in the image forming apparatus 1 of the fifth embodiment, the department function management list 23b includes the organization-wide guest management information 23f related to a guest department code set as one common guest department code to be shared by all of the plurality of organizational departments, the dedicated department guest management information 23g related to guest department codes set one with respect to each organizational department, and the common department guest management information 23h related to a plurality of guest department codes each set as one common guest department code to be shared by some organizational departments previously selected from the plurality of organizational departments.

According to this configuration, it is possible to set function-use permission/prohibition and function use restriction with respect to a plurality of various guest departments such as one common guest department common to all of a plurality of organizational departments, guest departments each dedicated to one of the plurality of organizational departments, and guest departments each common to some organizational departments previously selected from the plurality of organizational departments. Thus, it is possible to perform simple department management with respect to each function corresponding to various manners in which the image forming apparatus 1 is used, and further to achieve improved handiness.

Embodiments of the present disclosure have been described above, but the scope of the present disclosure is not limited to the embodiments, and the present invention can be implemented in variously modified forms within the spirit of the invention.

For example, functions available in the image forming apparatus 1 are not limited to printing (copying), scanning (image reading), or facsimile transmission, and other functions may also be available. The function-use permission/prohibition and function-use restriction settings described referring to FIG. 6 and FIG. 8 are merely examples, and these settings may be changed as necessary.

In the embodiments described above, the image forming apparatus 1 is an image forming apparatus for color printing, but this is not meant to limit the present disclosure, and the image forming apparatus 1 may be an image forming apparatus for monochrome printing, or may be an image forming apparatus such as a printer.

The image forming apparatus 1 may be operated such that the department management mode is in conjunction with a physical access management system managing entry and exit into and from an organization building or the like. A physical access control system is a known technique, in which, for example, employee IC cards and guest IC cards are used to control and record entry/exit into and from an organization building, an organization office, etc. The conjunction may be such that, in a case where a person who wants to use the image forming apparatus 1 is recognized as a guest by the physical access control system, the person is permitted to use the image forming apparatus 1 in the department management mode as a department management guest.

What is claimed is:

1. An image forming apparatus comprising:
    a storage unit storing therein
        organizational department codes previously set one corresponding to each of a plurality of different organizational departments for a member of any of the organizational departments to use the image forming apparatus,
        a guest department code previously set for a department management guest, who does not belong to any of the organizational departments, to use the image forming apparatus, and
        department function management information for managing function-use permission/prohibition with respect to each of the organizational department codes and the guest department code;
    a display unit that displays whether a user is going to use the image forming apparatus as a member of any of the organizational departments or as the department management guest;
    an input unit that receives an input of one of a selection indicating that a user is going to use the image forming apparatus as a member of any of the organizational departments and a selection indicating that a user is going to use the image forming apparatus as the department management guest; and
    a control unit that sets the guest department code with respect to the department management quest and finds which function is available based on the guest department code and the department function management information in a case where a use request is received via the input unit from the department management guest.

2. The image forming apparatus according to claim 1, wherein
    in a case where a function that is available to the guest department is selected, the control unit permits use of the function, and
    in a case where a function that is not available to the guest department is selected, the control unit requires an input of one of the organizational department codes, and
    if the function has been set to be available with respect to the inputted one of the organizational department codes, the control unit permits use of the function, and
    if the function has not been set to be available to the inputted organizational department code, the control unit does not permit use of the function.

3. The image forming apparatus according to claim 1, further comprising a communication unit capable of communicating with an external terminal device,
    wherein
    the control unit receives, via the communication unit, job execution request information that is related to use of a function and that includes an organizational department code from among the organizational department codes or the guest department code, and
    the control unit finds which function is available based on the organizational department code or the guest department code included in the job execution request information.

4. The image forming apparatus according to claim 3, wherein
    the control unit does not permit use of the function in a case where neither the organizational department codes nor the guest department code is included in the job execution request information.

5. The image forming apparatus according to claim 1, wherein
    the guest department code is provided such that
        one guest department code is shared by all the plurality of different organizational departments,
        a plurality of guest department codes are provided one for each of the plurality of different organizational departments, or
        a plurality of guest department codes are each shared by some organizational departments of the plurality of different organizational departments.

6. The image forming apparatus according to claim 1, wherein in a case where the input unit has received a use request from a member of any of the plurality of different organizational departments, the control unit makes the display unit display an input window for requesting an input of an organizational department code from among the organizational department codes, and the control unit finds which function is available based on the organizational department code inputted via the input window and the department function management information.

* * * * *